United States Patent
Nagasawa et al.

(10) Patent No.: US 7,641,890 B2
(45) Date of Patent: Jan. 5, 2010

(54) INORGANIC FINE PARTICLE AND METHOD FOR PRODUCING THE SAME USING MICROCHANNEL

(75) Inventors: Hideharu Nagasawa, Minami-Ashigara (JP); Yasunori Ichikawa, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 153 days.

(21) Appl. No.: 11/723,258

(22) Filed: Mar. 19, 2007

(65) Prior Publication Data

US 2007/0292686 A1 Dec. 20, 2007

(30) Foreign Application Priority Data

Mar. 20, 2006 (JP) .............................. 2006-077590

(51) Int. Cl.
*B01F 5/06* (2006.01)
(52) U.S. Cl. ............................ 423/659; 423/1; 423/610; 423/85; 423/DIG. 9; 106/436; 422/129; 422/150; 516/90
(58) Field of Classification Search ............. 423/1, 423/659, 610, 85, DIG. 9; 106/436; 422/129, 422/150; 516/90
See application file for complete search history.

(56) References Cited

U.S. PATENT DOCUMENTS

| 2005/0016851 | A1* | 1/2005 | Jensen et al. ................. 204/471 |
| 2007/0056471 | A1* | 3/2007 | Sato et al. .................... 106/493 |

FOREIGN PATENT DOCUMENTS

| DE | 102005048201 | * | 4/2006 |
| EP | 1930070 | * | 6/2008 |
| JP | 2005-272270 A | | 10/2005 |
| JP | 2005-288254 A | | 10/2005 |
| JP | 2005-289660 A | | 10/2005 |
| JP | 2006-8475 A | | 1/2006 |
| JP | 2006-37090 A1 | | 2/2006 |

OTHER PUBLICATIONS

Michiya Takagi, et al., "Production of titania nanoparticles by using a new microreactor assembled with same axle dual pipe", Elsevier B. V., Chem. Eng. J. 2004, 101, pp. 269-276.
T. Tsujiuchi, et al., "Study on control method for particle growth process using double-pipe microreactor", Proceedings of the 37th Autumn Meeting of The Society of Chemical Engineers, Japan, I-317, 2005.
Hideharu Nagasawa, et al., "Design of a New Micromixer for Instant Mixing Based on the Collision of Micro Segments", CET, Chem. Eng. Technol., 2005, pp. 324-330, vol. 28, No. 3, http://www.cet-journal.de.
"The 4th Series of Experimental chemistry", ed., The Chemical Society of Japan, 1993, vol. 12, pp. 410-488, Maruzen Co., Ltd.

* cited by examiner

*Primary Examiner*—Steven Bos
(74) *Attorney, Agent, or Firm*—Sughrue Mion, PLLC

(57) ABSTRACT

The present invention provides a method for producing an inorganic fine particle comprising the step of: reacting two or more reaction solutions for forming an inorganic fine particle while the reaction solutions flow in a non-laminar flow state in a microchannel, thereby form the inorganic fine particle, and an inorganic fine particle produced by the production method. The method for producing an inorganic fine particle of the present invention can stably produce monodisperse inorganic fine particles of nanometer size and allows for flexible response to formulation conditions (e.g., varying flow rate ratios between reaction solutions to be mixed) and for high-throughput production.

19 Claims, 6 Drawing Sheets

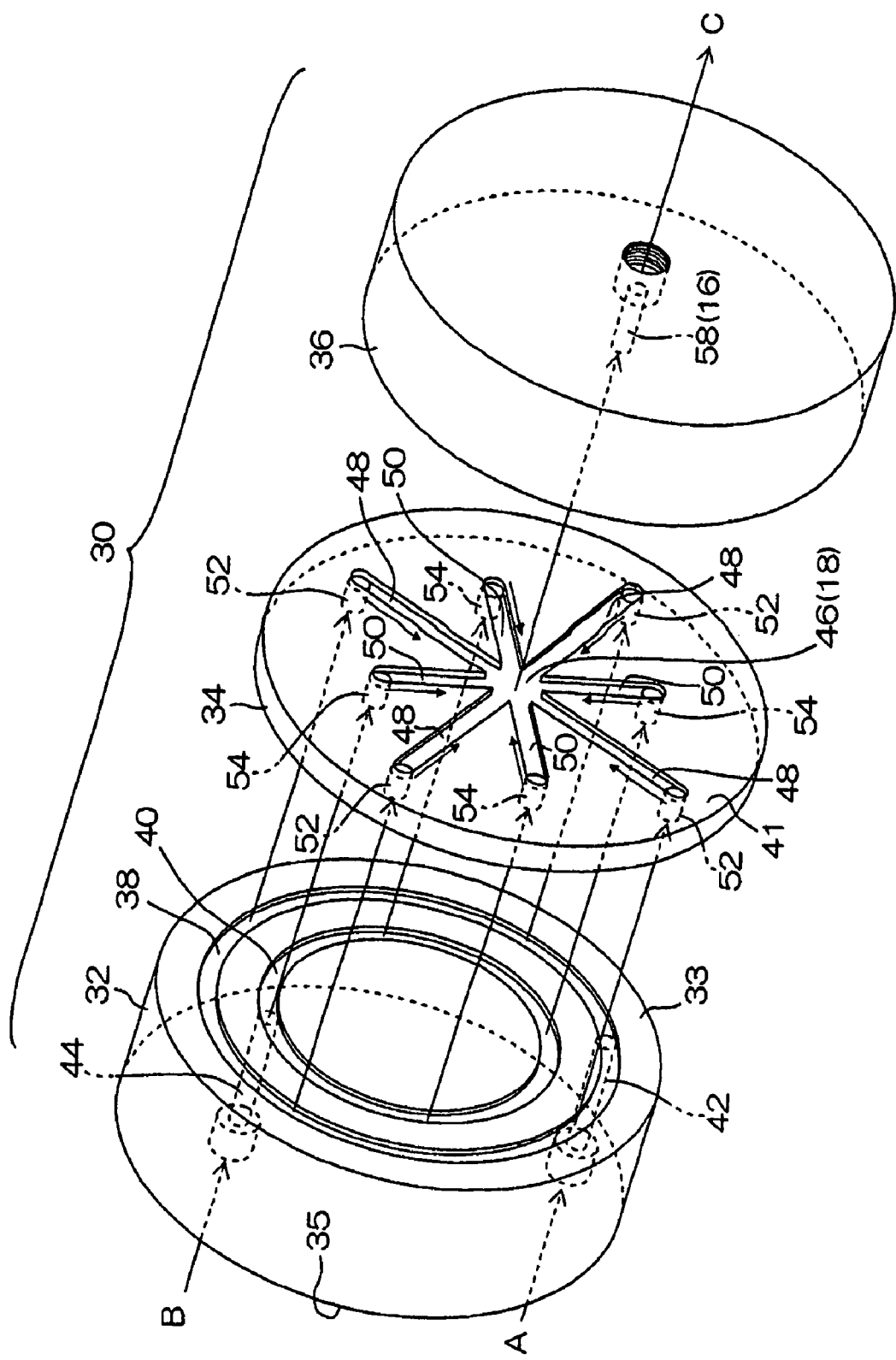

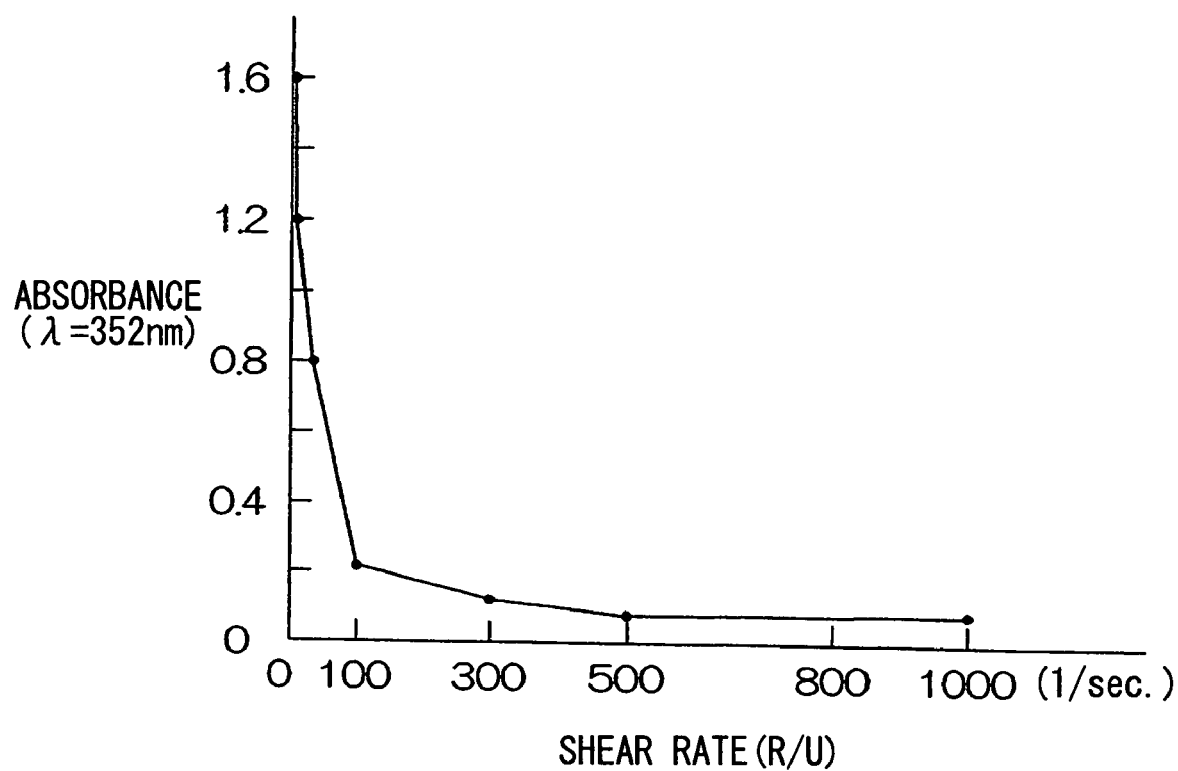

INORGANIC FINE PARTICLE AND METHOD FOR PRODUCING THE SAME USING MICROCHANNEL

BACKGROUND OF THE INVENTION

1. Field of the Invention

The present invention relates to an inorganic fine particle and a method for producing the same. Particularly, the present invention relates to a technique for producing a titanium dioxide fine particle industrially utilized in wide applications such as white pigments, photocatalytic materials, and medical materials.

2. Description of the Related Art

Inorganic fine particles are widely utilized as materials for a variety of industrial products. Particularly, titanium dioxide, one of the inorganic fine particles, is utilized in wide applications such as white pigments for electronic displays, paints, inks, plastics, fibers, cosmetics, and paper and as photocatalytic materials for construction materials by exploiting its light scattering ability or photoactivated decomposition ability (e.g., Japanese Patent Application Laid-Open Nos. 2005-272270, 2006-037090, and 2006-008475). Since titanium dioxide is an exceedingly stable substance in the atmosphere or in solutions and is safe with low toxicity, its use as a medical material such as a drug delivery system (DDS) in cancer therapy and the like is also expected (e.g., Japanese Patent Application Laid-Open No. 2005-289660).

Such industrially useful performance of titanium dioxide fine particles is expressed mainly depending on the size, size distribution, and crystal structure thereof. Particularly, for the expression of optical or photocatalytic properties, it is important to increase the surface area per unit volume. Specifically, it is important to produce fine particles at a nanometer level. For uniformity in the expressed performances, it is important to make fine particle size distribution monodisperse.

The production of favorably monodisperse fine particles is required not only for titanium dioxide but also for many other inorganic materials. Techniques for producing fine particles become increasingly important for the future industrial use of inorganic materials.

General methods for producing fine particles are broadly classified into a breakdown method as shown in, for example, "The 4th Series of Experimental chemistry" (ed., The Chemical Society of Japan, 1993, vol. 12, p. 411-488, Maruzen Co., Ltd.) wherein fine particles are produced from bulk substances by pulverization or the like, and into a buildup method wherein fine particles are produced by particle growth from a gaseous or liquid phase. The pulverization technique using the breakdown method has frequently been used so far and is a highly practical method for producing fine particles. However, this technique presents various problems such as exceedingly low productivity and a limited number of applicable substances in producing particles of nanometer size. Thus, a method for producing fine particles of nanometer size by the buildup method has been studied in recent years.

The buildup methods are broadly classified into solid-phase, gaseous-phase, and liquid-phase methods according to the type of a reaction phase. The gaseous-phase and liquid-phase methods are allegedly suitable for the synthesis of fine particles of nanometer size. The gaseous-phase methods are classified into a physical agglomeration process by high-temperature vapor cooling (physical vapor deposition (PVD) process) and into a particle generation process by gas-phase chemical reaction (chemical vapor deposition (CVD) process). These approaches can produce highly pure particles having a small diameter and as such, have been utilized widely. However, the approaches present problems in strictly controlling particle sizes and monodispersity. On the other hand, the liquid-phase methods have an advantage of being capable of mixing raw materials at a molecular level and are classified into sol-gel, alkoxide, reversed micelle, hot-soap methods, and so on.

One of methods for producing fine particles by the liquid-phase method of the buildup method, which has gotten attention recently, uses a "micro chemical process technique" (e.g., Japanese Patent Application Laid-Open No. 2005-288254). The "micro chemical process technique" is a technique for efficiently performing chemical reaction by use of a reaction channel having a very small cross section. Specifically, this technique performs substance production, chemical analysis, and so on, by utilizing chemical/physical phenomena occurring in a microchannel of several μm to several hundreds of μm in width formed on a solid substrate by a microprocessing technique or the like. M. Takagi et al. ("Production of titania nanoparticles by using a new microreactor assembled with same axle dual pipe", Elsevier B. V., Chem. Eng. J. 2004, 101, p. 269-276) and T. Tsujiuchi et al. ("Study on control method for particle growth process using double-pipe microreactor", Proceedings of the 37th Autumn Meeting of The Society of Chemical Engineers, Japan, I-317, 2005) have proposed the production of titanium dioxide fine particles using, as a mixing propulsion, molecular diffusion that utilizes orderly laminar flows in a microchannel, wherein the average size of the titanium dioxide fine particles is controlled within a range of 50 to 80 nm, with their monodispersity maintained, by changing operation conditions such as the diameter of a double-pipe microchannel and a flow rate.

SUMMARY OF THE INVENTION

However, simply the use of micro chemical process techniques cannot stably produce favorably monodisperse inorganic fine particles (e.g., titanium dioxide fine particles) of nanometer size. Thus, further modifications in the production techniques thereof are required.

The present invention has been completed in view of such circumstances. An object of the present invention is to provide a method for producing an inorganic fine particle, which can stably produce monodisperse inorganic fine particles of nanometer size and allows for flexible response to formulation conditions (e.g., varying flow rate ratios between reaction solutions to be mixed) and for high-throughput production, and to provide an inorganic fine particle produced by the production method.

To attain the object, a first aspect of the present invention provides a method for producing an inorganic fine particle comprising the step of allowing two or more reaction solutions for forming an inorganic fine particle to flow in a non-laminar flow state in a microchannel and reacting the reaction solutions during the flowing process to thereby form the inorganic fine particle.

According to the first aspect of the present invention, when two or more reaction solutions for forming an inorganic fine particle are allowed to flow in a microchannel to thereby produce the inorganic fine particle, the reaction solutions are allowed to flow in a non-laminar flow state in the microchannel. Therefore, increase in the contact area between the solutions per unit time and decrease in diffusion/mixing length can be achieved, thereby allowing for the instant mixing of the solutions. As a result, monodisperse inorganic fine particles of nanometer size can be produced stably.

The non-laminar flow defined by the present invention refers to a flow involving regular or irregular changes, which includes flows containing laminar vortex areas typified by Karman vortex and Taylor vortex to turbulent flow areas. Details thereof will be described later.

To attain the object, a second aspect of the present invention provides a method for producing an inorganic fine particle by allowing two or more reaction solutions for forming an inorganic fine particle to flow in a microchannel and forming the inorganic fine particle during the flowing process, the production method comprising: a dividing step of dividing at least one of the two or more reaction solutions into plural solutions; a joining step of joining at least one of the plural divided solutions with the other solution(s) of the two or more solutions different from the one divided solution so that the central axes thereof intersect with each other at one point in a confluence region; and a reacting step of reacting the joined solutions during the flowing process in the microchannel to thereby form the inorganic fine particle.

According to the second aspect of the present invention, at least one of the two or more reaction solutions is divided into plural solutions, and at least one of the plural divided solutions is joined with the other solution(s) of the two or more solutions different from the one divided solution so that the central axes thereof intersect with each other at one point in a confluence region.

In this context, for example, when the solutions flowing in channels are cylindrical in shape, the central axes of the solutions refer to the center line of the cylinder in the axial direction. When the solution exhibits the central axis in the channel, an axis along the longitudinal direction of the channel, which passes through the center (geometrical center) of a section perpendicular to the longitudinal direction of the channel, corresponds to the central axis.

The reaction of the two or more solutions in the microchannel is usually caused by mixing using molecular diffusion in principle. Therefore, mixing that increases the contact area between the two or more solutions per unit time is required for achieving instant mixing using molecular diffusion. When the two or more solutions are reacted, the supply flow rates thereof into the microchannel are generally different from each other. The direct supply of these two or more solutions having different supply flow rates into the microchannel causes instable flows in the microchannel, resulting in instable reaction.

To solve this problem, in the present invention, at least one of the two or more reaction solutions is divided into plural solutions before the joining of the two or more reaction solutions. Besides, all the solutions including the plural divided solutions are joined at the joining step, while the solutions are joined so that the central axes thereof intersect with each other at a predetermined intersecting angle at one point in a confluence region. Increase in the contact area between the solutions and decrease in diffusion/mixing length are achieved by the joining of these divided flows and by a contracted flow attributed to a change of direction of each solution flow at the time of the joining. As a result, instant mixing can be achieved. Thus, the reaction of the reaction solutions in the microchannel can be completed instantly by this instant mixing. Therefore, favorably monodisperse inorganic fine particles of nanometer size can be produced stably.

Moreover, divided solutions permit for instant mixing even by use of a microchannel of relatively large typical dimension. Therefore, excellently monodisperse inorganic fine particles of nanometer size can be produced at a high throughput. Furthermore, the use of the microchannel of relatively large typical dimension allows for operation with a low pressure drop. Therefore, energy-saving, environmentally friendly operation can be attained.

A third aspect of the present invention provides the method for producing an inorganic fine particle according to the second aspect, wherein the two or more reaction solutions are allowed to flow in a non-laminar flow state in the microchannel.

In the third aspect, the flows of the solutions having a high flow velocity, particularly at the time of joining, have large kinetic energy. Therefore, a contracted flow attributed to a change of directions of the flows remarkably occurs, while a convection vortex also occurs. This forms a non-laminar flow state and therefore promotes increase in the contact area between the two or more solutions and decrease in diffusion/mixing length, thereby allowing for further instant mixing.

A fourth aspect of the present invention provides the method for producing an inorganic fine particle according to any one of the first to third aspects, wherein the microchannel has a characteristic length between 1 μm and 1000 μm inclusive in terms of an equivalent diameter.

The fourth aspect specifies a preferable diameter of the microchannel in practicing the present invention. A microchannel less than 1 μm in terms of an equivalent diameter is difficult to produce, whereas a microchannel exceeding 1000 μm in terms of an equivalent diameter increases the thickness of the solution flow and hardly causes instant mixing. A more preferable diameter of the microchannel is between 5 μm and 800 μm inclusive, particularly preferably between 10 μm and 500 μm inclusive, in terms of an equivalent diameter.

A fifth aspect of the present invention provides the method for producing an inorganic fine particle according to any one of the first to fourth aspects, further comprising the step of changing a shear rate (1/sec.) represented by U/R wherein the equivalent diameter of the microchannel and the average flow velocity of the solutions flowing in the microchannel are defined as R (m) and U (m/sec.), respectively.

The fifth aspect shows the flow in a non-laminar flow state with a shear rate (U/R) (1/sec.) as an index. Mixing performance can be changed by changing the shear rate (U/R) (1/sec.). As a result, the particle sizes of the produced inorganic fine particles can be changed, though depending on the deposition speed of the inorganic fine particles.

A sixth aspect of the present invention provides the method for producing an inorganic fine particle according to the fifth aspect, wherein the shear rate (U/R) is set to 100 (1/sec.) or more. This is because instant mixing is achieved by setting the shear rate (U/R) to 100 (1/sec.) or more.

A seventh aspect of the present invention provides the method for producing an inorganic fine particle according to any one of the second to sixth aspects, wherein the joining step further comprises contracting the flow of the solutions in the confluence region by specifying an intersecting angle between the central axes of the solutions at the time of joining so that the intersecting angle satisfies S1>S2 wherein the total sum of the cross sections of all the joined solutions in the thickness direction and the cross section of the microchannel in the radial direction are defined as S1 and S2, respectively.

The flow of the solutions in the confluence region is contracted by appropriately specifying an intersecting angle between the central axes of the solutions at the time of joining. As a result, further increase in the contact area between the solutions and further decrease in diffusion/mixing length can be achieved. Therefore, instant mixing is performed more easily. The intersecting angle can be specified by changing an intersecting angle which the central axes of supply channels for the solutions to be joined in the confluence region form.

An eighth aspect of the present invention provides the method for producing an inorganic fine particle according to any one of the second to seventh aspects, wherein a mixing time from the joining of the solutions in the confluence region to discharge thereof from the microchannel is set to between 1 microsecond and 1000 milliseconds inclusive.

The eighth aspect specifies a preferable instant mixing time for stably producing monodisperse inorganic fine particles of nanometer size. Preferably, the mixing time to discharge from the microchannel is set to between 1 microsecond and 1000 milliseconds inclusive, more preferably between 10 microseconds and 500 milliseconds inclusive.

A ninth aspect of the present invention provides the method for producing an inorganic fine particle according to any one of the first to eighth aspects, wherein the reaction solution(s) contain dispersant(s).

The dispersant rapidly adsorbs to the formed inorganic fine particles and prevents these inorganic fine particles from agglomerating again. As a result, much finer particles can be obtained.

A tenth aspect of the present invention provides the method for producing an inorganic fine particle according to the ninth aspect, wherein at least one of the dispersants is a low-molecular-weight dispersant.

The dispersant for forming inorganic fine particles generally includes anionic, cationic, amphoteric, and high-molecular-weight dispersants. The low-molecular-weight dispersant more effectively prevents the inorganic fine particles from agglomerating.

An eleventh aspect of the present invention provides the method for producing an inorganic fine particle according to any one of the first to tenth aspects, wherein the inorganic fine particle is obtained in a form of a dispersion liquid thereof.

To attain the object, a twelfth aspect of the present invention provides an inorganic fine particle produced by a production method according to any one of the first to eleventh aspects, wherein the inorganic fine particle has a mode diameter of 1 μm or less.

The production method of the present invention can produce inorganic fine particles having a mode diameter of 1 μm or less.

A thirteenth aspect of the present invention provides the inorganic fine particle according to the twelfth aspect, wherein the inorganic fine particle is a titanium dioxide fine particle.

Favorable monodispersity and a nanometer size are exceedingly important for the expression of performance of the optical and photocatalytic properties of titanium dioxide fine particles, one of inorganic fine particles. The present invention is effective from this viewpoint.

To attain the object, a fourteenth aspect of the present invention provides a method for producing a titanium dioxide fine particle comprising producing a titanium dioxide fine particle by a production method according to any one of the first to eleventh aspects.

According to the fourteenth aspect, the method for producing an inorganic fine particle according to any one of the first to eleventh aspects is particularly effectively applied to the production of titanium dioxide fine particles.

A fifteenth aspect of the present invention provides the method for producing a titanium dioxide fine particle according to the fourteenth aspect, wherein a reaction for producing the titanium dioxide fine particle is alkoxide hydrolysis.

Alkoxide hydrolysis is suitable to the reaction for producing the titanium dioxide fine particle.

A sixteenth aspect of the present invention provides the method for producing a titanium dioxide fine particle according to the fifteenth aspect, wherein a reaction temperature in the microchannel falls within a range of 0 to 50° C.

The alkoxide hydrolysis produces highly pure titanium dioxide fine particles through rapid reaction at a reaction temperature falling within a range of 0 to 50° C. and has advantages such as relatively high productivity and reduced consumption energy in the production. A more preferable reaction temperature falls within a range of 5 to 30° C.

According to the present invention, excellently monodisperse inorganic fine particles of nanometer size can be produced stably, as described above. The present invention also allows for flexible response to formulation conditions (e.g., varying flow rate ratios between reaction solutions to be mixed) and for high-throughput production.

BRIEF DESCRIPTION OF THE DRAWINGS

FIG. 4 is a schematic diagram of a three-dimensional microreactor apparatus to which the method for producing an inorganic fine particle of the present invention is applied;

FIG. 6 is a diagram for illustrating the relationship between a shear rate and mixing performance in a microchannel.

DETAILED DESCRIPTION OF THE PREFERRED EMBODIMENTS

Figure 1:
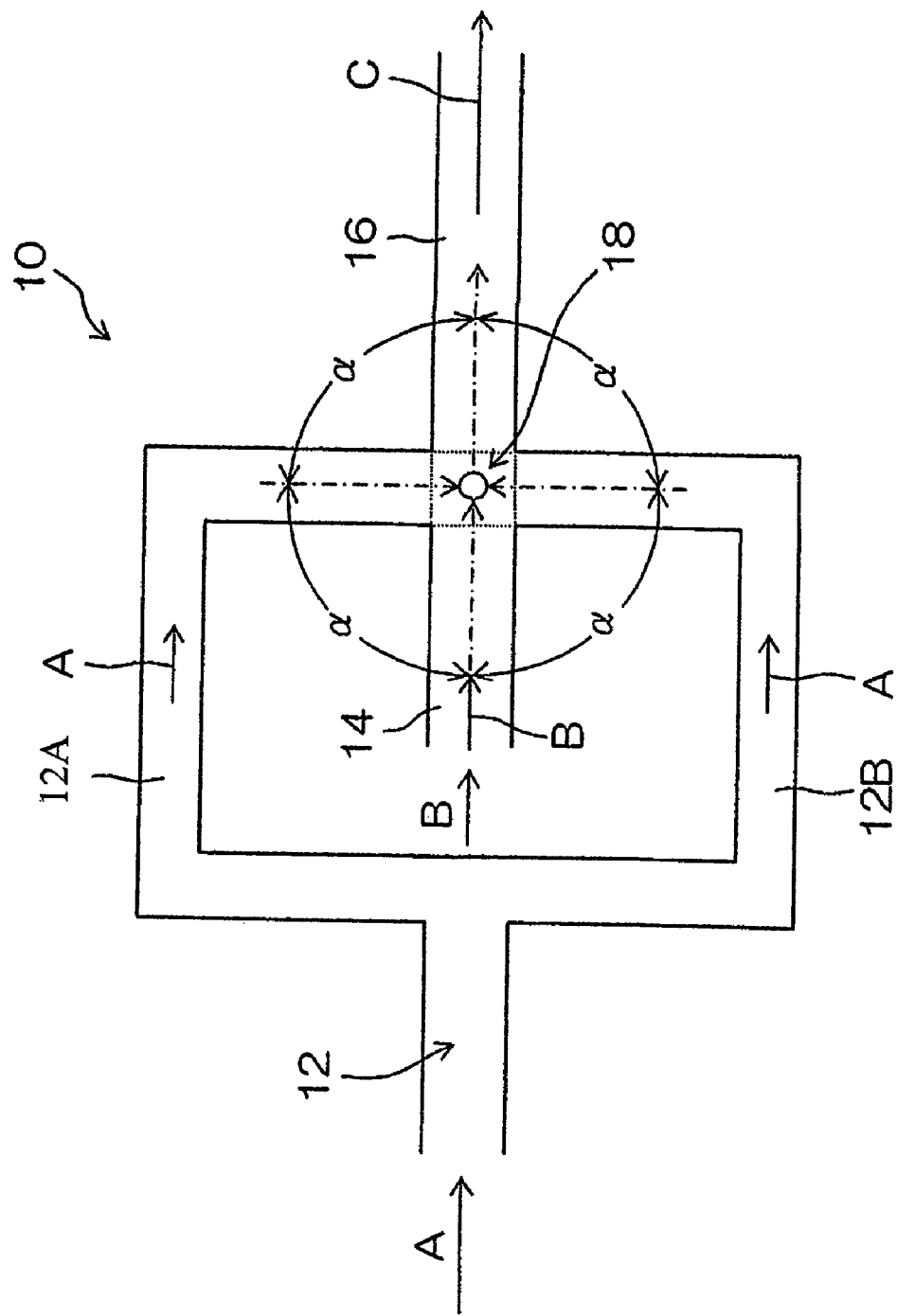
FIG. 1 is a schematic diagram of a planar microreactor apparatus to which a method for producing an inorganic fine particle of the present invention is applied.

Hereinafter, the preferred embodiments of an inorganic fine particle and a method for producing the same according to the present invention will be described in detail with reference to the accompanying drawings. Like reference numerals refer to like elements throughout the specification.

A method for producing an inorganic fine particle of the present invention comprises allowing two or more reaction solutions for forming an inorganic fine particle to flow in a non-laminar flow state in a microchannel and reacting the reaction solutions during the flowing process to thereby form the inorganic fine particle. The formation of this non-laminar flow in the microchannel promotes the active mixing of the solutions, thereby allowing for instant mixing. As a result, excellently monodisperse inorganic fine particles of nanometer size are stably produced.

The non-laminar flow defined by the present invention refers to a flow involving regular or irregular changes. When a first viscous fluid (e.g., water) is allowed to flow in the microchannel and a second different viscous fluid (e.g., colored water) is injected into a pipe thinner than the microchannel inserted on the central axis thereof, the colored water usually becomes one linear flow free from changes at a sufficiently low flow velocity and stably flows in parallel to the channel axis. As the flow velocity is gradually increased, this flow shifts to an instable flow involving changes. The second viscous fluid mixes with the first viscous fluid by turbulence attributed to the changes. The changes have a regular or irregular form. The present invention encompasses both of these forms.

Examples of the flow involving regular changes include: a flow in which when a columnar object is moved at an appropriate speed in a fluid, counterrotating vortices (Karman vortex) are generated alternately from both sides of the object in the wake of the object under certain flow conditions and form two regular lines; and a flow in which a fluid in the annulus of two coaxial cylindrical tubes generates a secondary rotating flow (Taylor vortex) by rotating the inner cylindrical tube. On the other hand, the flow involving irregular changes includes a flow in a so-called turbulent flow state in which the occurrence and disappearance of vortices varying in size from small to large are disorderly repeated.

Various factors can cause regular or irregular changes, and examples thereof include structures in channels, the movement or oscillation of the wall, external forces such as electromagnetic force, and internal forces such as the microseism and kinetic energy of a fluid itself. The formation of such a flow in a non-laminar flow state is effective when two or more fluids need to be mixed rapidly and completely. Complete mixing is generally a state in which molecules constituting two or more fluids are uniformly formulated. The final process thereof is mixing (uniformalization) using molecular diffusion. The point for this purpose is that the contact area between these two or more fluids, one of important parameters of the amount of molecular diffusion, is increased in a shorter time. In general, a viscous fluid flowing in a microchannel is greatly influenced by viscous force relative to the inertial force. Therefore, such increase in the contact area is difficult to cause. However, a flow involving regular or irregular changes (convection), that is, a so-called non-laminar flow is generated by utilizing the external forces and the internal forces. As a result, increase in the contact area per unit time can be achieved, thereby allowing for rapid complete mixing.

REFERENCES

1) Chemical Engineering Handbook, revised, 6th edition, ed., The Society of Chemical Engineers, Japan, Maruzen Co., Ltd.
2) Dictionary of Physics and Chemistry, 5th edition, Iwanami Shoten
3) M. Engler et al., "Effective Mixing by the Use of Convective Micro Mixers", Conference Proceedings, 2005 Spring National Meeting, AIChE, 128d Next, exemplary microreactor apparatuses for practicing the method for producing an inorganic fine particle of the present invention will be described. However, the present invention is not limited to these apparatuses. For microreactor apparatuses, it is only necessary to be capable of forming a non-laminar flow state in a microchannel. The description will be given blow by taking two reaction solutions A and B as an example of solutions for producing inorganic fine particles.

FIG. 1 is one example of a planar microreactor apparatus to which the method for producing an inorganic fine particle of the present invention is applied.

As shown in FIG. 1, a microreactor apparatus 10 is constructed so that two divided supply channels 12A and 12B capable of dividing a reaction solution A into two solutions, which branch off at some midpoint from one supply channel 12 for supplying the reaction solution A, one undivided supply channel 14 for supplying a reaction solution B, and a microchannel 16 for reacting the reaction solution A with the reaction solution B communicate with each other in one confluence region 18 to produce a joined reaction solution C. These divided supply channels 12A and 12B, supply channel 14, and microchannel 16 are located at equal spaces of 90° around the confluence region 18 in substantially the same plane. Specifically, the central axes (denoted by alternate long and short dash lines in FIG. 1) of the channels 12A, 12B, 14, and 16 intersect in the shape of a cross (intersecting angle $\alpha=90°$) in the confluence region 18. Although only the supply channel 12 for the reaction solution A that is supplied in an amount larger than that of the reaction solution B is divided in FIG. 1, the supply channel 14 for the reaction solution B may also be divided into plural channels. The intersecting angles $\alpha$ of the channels 12A, 12B, 14, and 16 located around the confluence region 18 are not limited to 90° and can be specified appropriately. The number of channels divided from the supply channel 12 or 14 is not particularly limited. However, too many divided channels complicate the structure of the microreactor apparatus 10. Therefore, preferably, the supply channel is divided into 2 to 10 channels, more preferably 2 to 5 channels.

Figure 2:
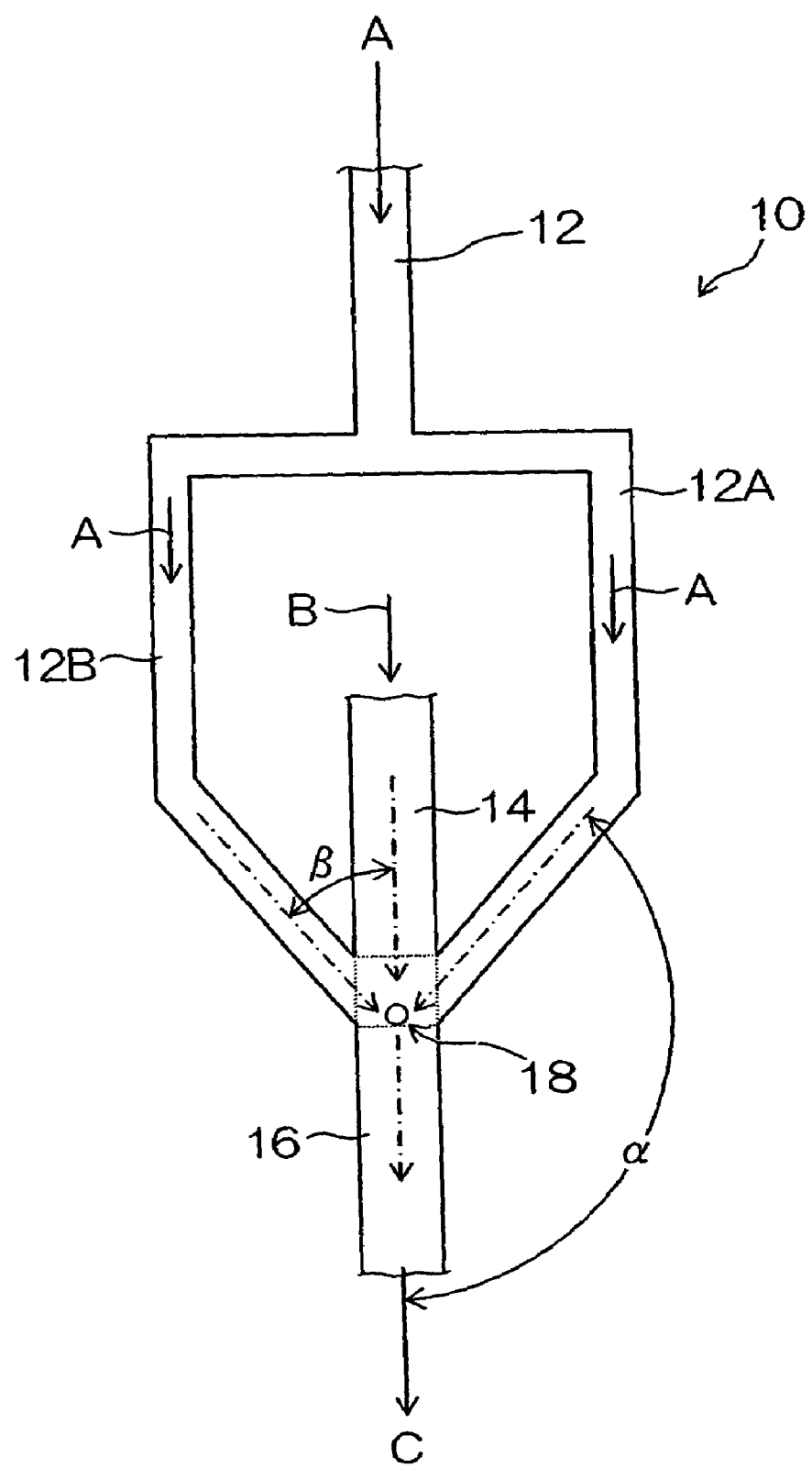
FIG. 2 is a schematic diagram showing a modification of the planar microreactor apparatus to which the method for producing an inorganic fine particle of the present invention is applied.

FIG. 2 is a modification of the planar microreactor apparatus 10 of FIG. 1. In FIG. 2, intersecting angles $\beta$ which the central axes of divided supply channels 12A and 12B form relative to the central axis of a supply channel 14 are formed at 45°, which is smaller than that in FIG. 1 (90°). Moreover, intersecting angles $\alpha$ which the central axis of a microchannel 16 forms relative to the central axes of the divided supply channels 12A and 12B are formed at 135°.

Figure 3:
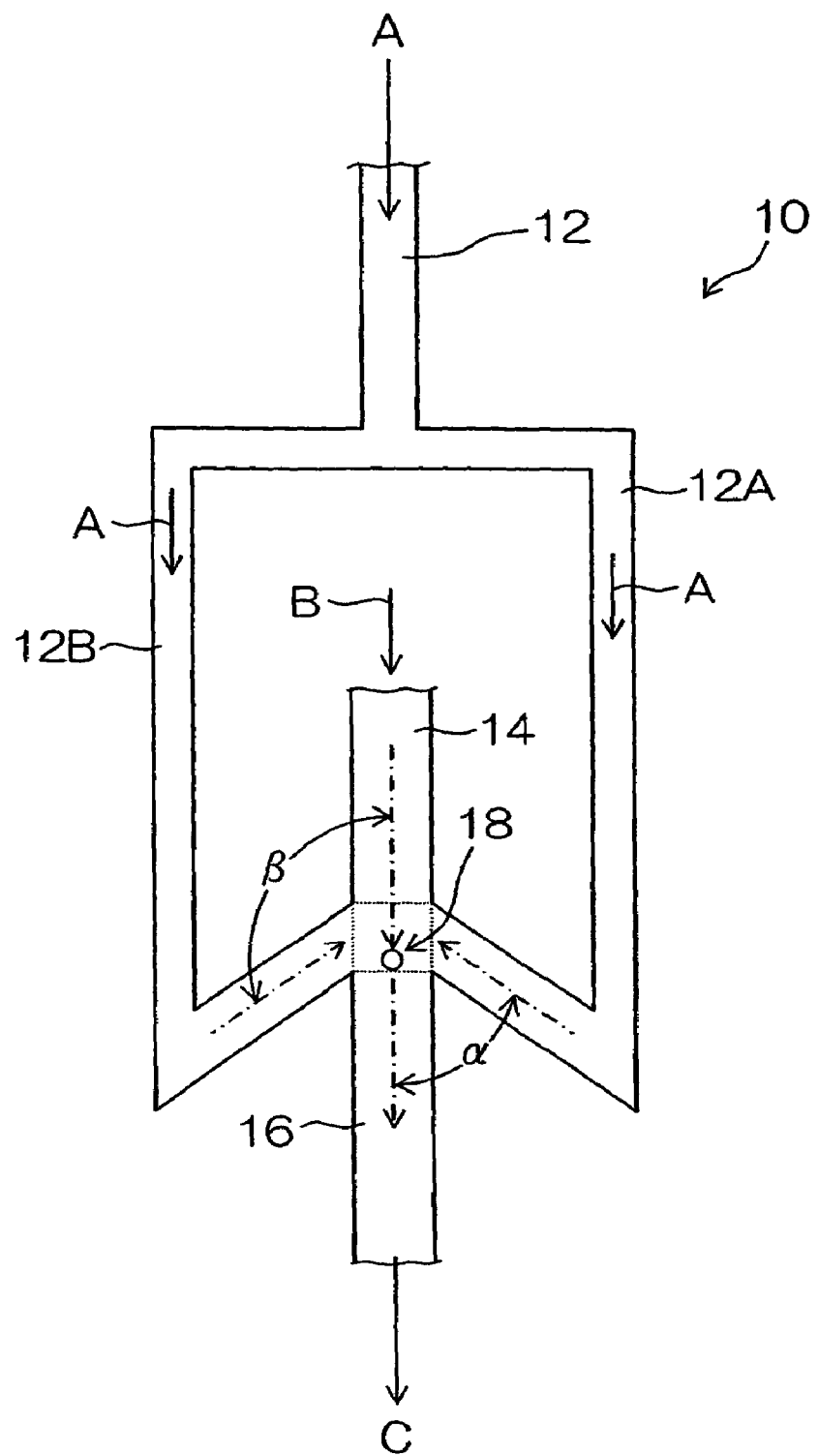
FIG. 3 is a schematic diagram showing another modification of the planar microreactor apparatus to which the method for producing an inorganic fine particle of the present invention is applied.

FIG. 3 is another modification of the planar microreactor apparatus of FIG. 1. In FIG. 3, intersecting angles $\beta$ which the central axes of divided supply channels 12A and 12B for supplying a reaction solution A form relative to the central axis of a supply channel 14 for supplying a reaction solution B are formed at 135°, which is larger than that in FIG. 1 (90°). Moreover, intersecting angles $\alpha$ which the central axis of a microchannel 16 forms relative to the central axes of the divided supply channels 12A and 12B are formed at 45°. The intersecting angles $\alpha$ and $\beta$ of the supply channel 14, the divided supply channels 12A and 12B, and the microchannel 16 relative to each other can be specified appropriately. Preferably, the intersecting angles $\alpha$ and $\beta$ are specified to satisfy S1>S2 wherein the total sum of the cross sections of all the joined reaction solutions B and A in the thickness direction and the cross section of the microchannel 16 in the radial direction are defined as S1 and S2, respectively. As a result, further increase in the contact area between the solutions A and B and further decrease in diffusion/mixing length can be achieved. Therefore, instant mixing is performed more easily.

FIG. 4 is one example of a three-dimensional microreactor apparatus 30 to which the method for producing an inorganic fine particle of the present invention is applied, and is an exploded perspective view showing, by a perspective view, a state in which the microreactor apparatus 30 is broken down into its three constituent parts. In the description below, the same reference numerals will be given to portions having the same function as those in FIGS. 1 to 3.

The three-dimensional microreactor apparatus 30 is mainly composed of a supply block 32, a confluence block 34, and a reaction block 36 each cylindrical in shape. To assemble the microreactor apparatus 30, these cylindrical blocks 32, 34, and 36 are combined in this order with their sides fitted to each other to take a cylindrical shape. In this state, the blocks 32, 34, and 36 are integrally fastened using bolts, nuts, or the like.

A side 33 of the supply block 32 facing the confluence block 34 is provided with two annular grooves 38 and 40 made in a concentric fashion. In the assembled microreactor apparatus 30, these two annular grooves 38 and 40 form ring-shaped channels where reaction solutions A and B flow. Penetrating holes 42 and 44 leading to the outer annular groove 38 and the inner annular groove 40, respectively, are formed from another side 35 of the supply block 32 that does not face the confluence block 34. Of these two penetrating holes 42 and 44, the penetrating hole 42 communicating with the outer annular groove 38 is connected with a supply device (e.g., a pump and a connecting tube) which supplies the reaction solution A, whereas the penetrating hole 44 communicating with the inner annular groove 40 is connected with a supply device (e.g., a pump and a connecting tube) which supplies the reaction solution B. In FIG. 4, the reaction solutions A and B are allowed to flow in the outer annular groove 38 and the inner annular groove 40, respectively. However, they may be reversed.

A circular confluence hole 46 is formed at the center of a side 41 of the confluence block 34 facing the reaction block 36. Four long radial grooves 48, 48, . . . and four short radial groves 50, 50, . . . are radiated out alternately from this confluence hole 46. In the assembled microreactor apparatus 30, these confluence hole 46 and radial grooves 48 and 50 form a circular space serving as the confluence region 18 and radial channels where the solutions A and B flow. Of these eight radial grooves 48 and 50, the tips of the long radial grooves 48 are respectively provided with penetrating holes 52, 52, . . . in the thickness direction of the confluence block 34. These penetrating holes 52 communicate with the outer annular groove 38 formed in the supply block 32. Likewise, the tips of the short radial grooves 50 are respectively provided with penetrating holes 54, 54, . . . in the thickness direction of the confluence block 34. These penetrating holes 54 communicate with the inner annular groove 40 formed in the supply block 32.

One penetrating hole 58 communicating with the confluence hole 46 is formed at the center of the reaction block 36 in the thickness direction of the reaction block 36. This penetrating hole 58 serves as the microchannel 16.

As a result, the reaction solution A is divided into four divided flows through the supply channel 12 composed of the penetrating hole 42 of the supply block 32→the outer annular groove 38→the penetrating hole 52 of the confluence block 34→the long radial grooves 48 and reaches the confluence region 18 (confluence hole 46). On the other hand, the reaction solution B is divided into four divided flows through the supply channel 14 composed of the penetrating hole 44 of the supply block 32→the inner annular groove 40→the penetrating hole 54 of the confluence block 34→the short radial grooves 50 and reaches the confluence region 18 (confluence hole 46). In the confluence region 18, the divided flows of the reaction solution A and the divided flows of the reaction solution B are joined with their respective kinetic energies. These joined flows change direction by 90° and enter into the microchannel 16.

Figure 5A:
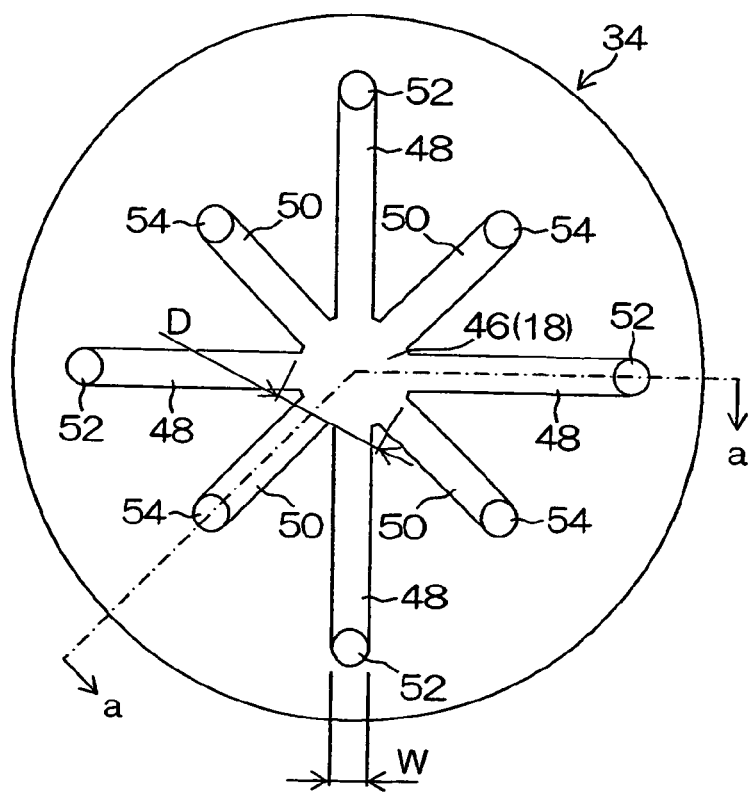
FIGS. 5A and 5B are plane and sectional views of the three-dimensional microreactor apparatus, respectively.
Figure 5B:
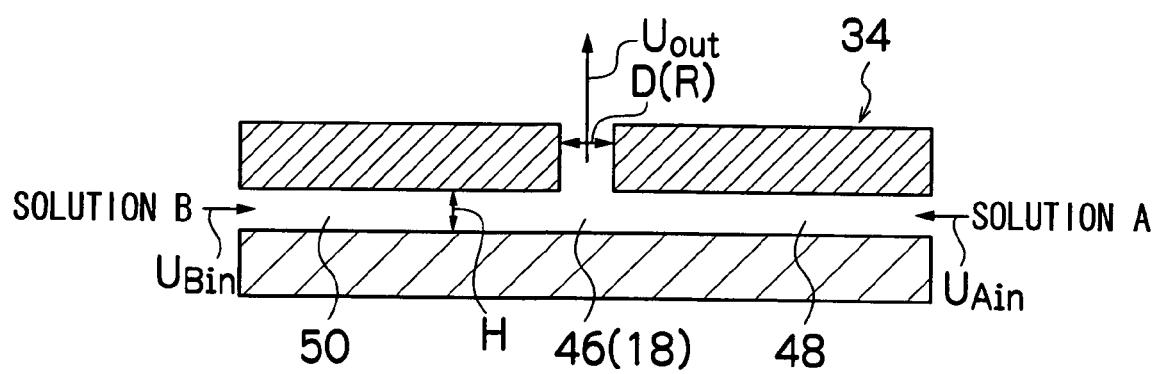

FIG. 5A is a plane view of the confluence block 34, and FIG. 5B is a sectional view taken along the a-a line of FIG. 5A. In FIGS. 5A and 5B, reference character W designates the widths of the divided supply channels 12 and 14, reference character H designates the heights of the divided supply channels 12 and 14, reference character D designates the diameter of the confluence region 18, and reference character R designates the diameter of the microchannel 16. The diameter of the confluence region 18 is usually equal to that of the microchannel 16. Moreover, reference character UAin designates an average flow velocity at which the reaction solution A flowing in each divided supply channel 12 enters into the confluence region 18, and reference character UBin designates an average flow velocity at which the reaction solution B flowing in each divided supply channel 14 enters into the confluence region 18. Moreover, reference character Uout designates an average flow velocity at which the joined solutions A and B go out of the confluence region 18 and enter into the microchannel 16.

The microchannel 16 is preferably a channel having a characteristic length (i.e., a length that predominantly determines the rheological properties of a fluid flowing in the channel 16) between 1 μm and 1000 μm inclusive, preferably between 5 μm and 800 μm inclusive, more preferably between 10 μm and 500 μm inclusive, in terms of an equivalent diameter. It may be 1000 μm or longer because increase in the contact area between the solutions and decrease in diffusion/mixing length can be achieved at a high flow velocity or with many divided supply channels. In this context, the equivalent diameter is a term used in the field of mechanical engineering. When a cylindrical tube equivalent to a pipe having any sectional shape (which corresponds to the channel in the present invention) is assumed, the diameter of the equivalent cylindrical tube is referred to as an equivalent diameter.

The equivalent diameter (deq) is defined as deq=4A/p wherein A: the cross section of a pipe and p: the length of the wet perimeter (circumferential length) of the pipe. This equivalent diameter, when applied to a cylindrical tube, is equal to the diameter of the cylindrical tube. The equivalent diameter is used for predicting the rheological or heat transfer properties of the pipe on the basis of data about the equivalent cylindrical tube and represents a spatial scale (characteristic length) of a phenomenon. The equivalent diameter is deq=$4a^2/4a$=a for a regular tetragon tube having a side a and deq=$a/\sqrt{3}$ for a regular triangle tube having a side a. Alternatively, the equivalent diameter is deq=2 h for a flow between parallel plates having a channel height h (see e.g., "Mechanical Engineering Dictionary" ed., The Japan Society of Mechanical Engineers, 1997, Maruzen Co., Ltd.).

The microreactor apparatuses 10 and 30 of FIGS. 1 to 4 thus constructed can be produced by utilizing semiconductor processing techniques, particularly, precision machining techniques such as etching (e.g., photolithographic etching) processing, ultrafine electrical discharge machining, optical molding, mirror finishing, and diffusion bonding techniques. Mechanical machining techniques using a lathe or drill press for general purposes can also be utilized.

Materials for the apparatuses 10 and 30 are not particularly limited, and any material to which the processing techniques described above can be applied may be used. Specifically, metal materials (iron, aluminum, stainless steel, titanium, a variety of metals, etc.), resin materials (fluorocarbon resins, acrylic resins, etc.), glass (silicon, quartz, etc.) can be used.

The supply devices which supply the reaction solutions A and B to the microreactor apparatuses 10 and 30 require a fluid control function of controlling solution flows. Particularly, fluid behavior in the microchannel 16 has properties different from that in macro-scale equipment. Therefore, possible control systems must be suitable to micro-scale equipment. The fluid control systems are classified into continuous flow systems and droplet (liquid plug) systems in terms of their forms and into electrical driving systems and pressure driving systems in terms of their driving forces.

Of these systems, the continuous flow system is used most widely. In general fluid control using the continuous flow system, the microchannel 16 is completely filled with a fluid, and the whole fluid is driven by a pressure source such as a syringe pump prepared outside. This method has a drawback such as large dead volumes but has a major advantage that the control system can be achieved with relatively simple set-up.

One of systems different from the continuous flow system is the droplet (liquid plug) system. In this system, droplets partitioned by air are moved in the interior of the apparatus or within the channels leading to the apparatus, and the individual droplets are driven by air pressure. This system requires preparing, in the interior of the reactor system, for example, a vent structure through which air between the droplet and the channel wall or between the droplets is discharged to the outside as required and a valve structure for maintaining pressure in the branching channels independently from other regions. The system also requires constructing, outside, a pressure control system comprising a pressure source and a switching valve, for operating the droplets by use of pressure difference control. Thus, the droplet system is capable of multi-stage operation such as some reactions sequentially performed by individually operating several droplets and expands the possibility of system configuration, though the apparatus configuration and reactor structure are slightly complicated.

Driving systems for fluid control in wide general use are an electrical driving method comprising generating an electroosmotic flow by a high voltage applied to both ends of the microchannel 16 and thereby moving a fluid and a pressure driving method comprising moving a fluid through pressure applied thereto with an external pressure source. A difference between these methods has been known to be in that, for example, from the viewpoint of fluid behavior, a flow velocity profile in the section of the channel exhibits flat distribution in the electrical driving system and exhibits hyperbolic distribution in the pressure driving system, in which the flow velocity is high in the central region of the channel and low in the wall surface part thereof. The electrical driving system is more suitable for such a purpose of moving a fluid with the shape of a sample plug or the like maintained. To perform the electrical driving system, the channel needs to be filled with a fluid. Therefore, the electrical driving system must assume the form of the continuous flow system. However, this electrical driving system can operate a fluid by electrical control and therefore achieves relatively complicated treatment such as a temporal concentration gradient created, for example, by continuously changing the mixing ratio of two solutions. The pressure driving system is capable of controlling a fluid regardless of its electrical properties and does not have to give consideration to secondary effects such as heat generation and electrolysis. Therefore, the pressure driving system hardly influences substrates and is applied to a wide range. On the other hand, this system requires automating complicated treatment, for example, because a pressure source must be prepared outside and the response characteristics of operation vary according to the magnitude of the dead volume of the pressure system. A method used as a fluid control method in the present invention is appropriately selected according to the purposes and is preferably the pressure driving system using the continuous fluid system.

Moreover, the control of a temperature (reaction temperature control) in the microchannel 16 may be performed by placing the whole apparatus into a temperature-controlled container or may be performed by conducting a thermal cycle involving heating with a heater structure such as metallic resistance wires or polysilicon created within the apparatus and cooling by natural cooling. Temperature sensing using the metallic resistance wire is preferably performed by additionally creating the same resistance wire as the heater and detecting a temperature on the basis of changes in the resistance value thereof, whereas temperature sensing using the polysilicon is preferably performed by conducting detection by use of a thermocouple. Alternatively, heating and cooling may be performed from the outside by bringing a Peltier element into contact with the channel. The method used is selected according to the uses of the apparatus, materials for the main body of the channel, and so on.

The number of the microreactor apparatuses 10 and 30 used in the present invention may be one, of course. If necessary, several apparatuses can be arranged in parallel (numbering-up) to increase the throughput thereof.

Next, the method for producing an inorganic fine particle of the present invention will be described using the microreactor apparatuses 10 and 30 thus constructed.

When inorganic fine particles are produced with the microreactor apparatuses 10 and 30 of FIGS. 1 to 4 thus constructed, inorganic fine particles are produced in any of the apparatuses 10 and 30 through three steps of dividing, joining, and reacting steps.

At the dividing step (in the supply block), at least one of two solutions (reaction solutions) A and B is divided into plural solutions.

At the joining step (in the confluence block), at least one of the plural divided solutions is joined with the other of the two solutions A and B so that the central axes thereof intersect with each other at one point in the confluence region 18.

At the reacting step (in the reaction block which may include the confluence hole of the confluence block), the reaction solutions A and B are reacted during the flowing process of the joined solutions A and B in the microchannel 16 to thereby form (generate) inorganic fine particles. For example, a precipitation, hydrolysis, or oxidation reduction method is appropriately adopted as a reaction method according to the type of reaction solutions for forming an inorganic fine particle. For example, alkoxide hydrolysis is preferably adopted as a reaction method for forming a titanium dioxide fine particle.

In the microreactor apparatuses 10 of FIGS. 1 to 3, the reaction solution A is divided into two solutions, whereas the reaction solution B is not divided. In the microreactor apparatus 30 of FIG. 4, the reaction solutions B and A are respectively divided into four solutions.

As described above, at least one of the reaction solutions A and B is divided into plural solutions before the joining of these solutions. Besides, all the solutions including the plural divided solutions are joined in the confluence region 18. Then, the joined solutions A and B are allowed to flow in the microchannel 16 by a change of direction of the flow thereof by a predetermined angle to thereby generate the kinetic energy of the flow of the joined solutions A and B and a contracted flow attributed to the change of direction of the flow. As a result, increase in the contact area between the solutions A and B and decrease in diffusion/mixing length are achieved, thereby allowing for instant mixing. Thus, the reaction of the reaction solutions A and B in the microchannel 16 can be completed instantly. Consequently, monodisperse inorganic fine particles of nanometer size can be produced stably.

In this context, the mixing is generally a procedure of uniformalizing powders, a powder and a fluid (liquid or gas), or fluids of two or more components. Particularly, the fluids of two or more components are desired to be uniformalized at a molecular level. The mixing in the microchannel 16 is mixing using molecular diffusion in principle. Therefore, the point for rapidly achieving mixing is that the contact area between these two or more fluids per unit time is increased. A preferable mixing time for instant mixing is set to between 1 microsecond and 1000 milliseconds inclusive, more preferably between 10 microseconds and 500 milliseconds inclusive, from the joining of the solutions to discharge from the microchannel 16.

A method for evaluating the mixing of miscible liquids has been described in, for example, "S. Panić, et. al., "Experimental approaches to a better understanding of mixing performance of microfluidic devices", Chem. Eng. J. 101, 2004, p. 409-p. 419". The mixing time can be calculated on the basis of a value obtained by dividing the volume (mL) of the microchannel 16 for performing mixing by the total flow rate (mL/sec.) in the volume under conditions that have seemed to perfectly complete the mixing in the mixing evaluation method.

The principles and method of mixing in the microchannel 16 have been described in detail in, for example, "V. Hessel. et. al., "Chemical Micro Process Engineering—Processing and Plant—", WILEY-VCH, 2005, p. 1-p. 280".

In such production of inorganic fine particles, preferably, a shear rate (1/sec.) represented by U/R wherein the equivalent diameter of the microchannel 16 and the average flow velocity of the solutions flowing in the microchannel 16 are defined as R (m) and U (m/sec.), respectively, is set to 100 or more for forming a non-laminar flow state in the microchannel 16.

FIG. 6 illustrates the relationship examined between a shear rate (U/R) and mixing performance in a microchannel 16 described in H. Nagasawa et al., "Design of a New Micromixer for Instant Mixing Based on the Collision of Micro Segments", WILEY-VCH Verlag GmbH & Co. KGaA, Chem. Eng. Technol. 2005, 28, No. 3, p. 324-330, wherein the mixing performance is evaluated by indicating the turbidity of a solution as absorbance. Specifically, the drawing shows that the larger the absorbance becomes, the poorer the mixing performance is or the smaller the absorbance becomes, the better the mixing performance is. As seen from FIG. 6, the absorbance is sharply decreased, as the shear rate (U/R) in the microchannel 16 is increased. The absorbance remains almost the same level from a shear rate (U/R) of 100 or more. This suggests that a mixing state different from that using molecular diffusion in a laminar flow state, that is, mixing using molecular diffusion in a non-laminar flow state, occurs in a region having a shear rate (U/R) of 100 or more. Thus, the relationship between the equivalent diameter R (m) of the microchannel 16 and the average flow velocity U (m/sec.) of the solutions flowing in the microchannel 16 can be designed appropriately to thereby set the shear rate (U/R) in the microchannel 16 to 100 or more, thereby allowing for instant mixing. From the graph of FIG. 6, the detailed behavior of mixing performance at a shear rate (U/R) of 1000 or more is unclear. However, when examination was conducted on the particle sizes of inorganic fine particles produced in a region of high level having a shear rate of approximately 20,000 (1/sec.) to approximately 100,000 (1/sec.), the particle sizes were also gradually decreased in this region of high level with increases in shear rate. This indicates that mixing performance is improved, as a shear rate is increased even after exceeding 1000 (1/sec.).

A contracted flow attributed to a change of direction of the solutions A and B in the confluence region 18 can be generated by appropriately designing the relationship between the average flow velocities of the solutions A and B at the time of joining and the intersecting angles α and β between the central axes of the solutions A and B at the time of joining. Moreover, the flow involving regular or irregular changes can be formed easily by rapidly changing the directions of the solutions A and B in the confluence region 18. Thus, a flow in a non-laminar flow state is considered to be easily formed in the microchannel 16 by appropriately designing the relationship between the average flow velocities of the solutions A and B entering into the confluence region 18 and the intersecting angles α and β between the central axes of the solutions A and B at the time of joining.

The temperatures of the solutions A and B flowing in the microchannel 16 may be in a range that does not coagulate or boil an aqueous solvent. A preferable reaction temperature is 0 to 50° C., more preferably 5 to 30° C. The flow rate of the reaction solutions A and B flowing in the microchannel 16 is preferably 0.1 to 5000 mL/min., more preferably 1 to 1000 mL/min., particularly preferably 5 to 500 mL/min. In the present invention, the concentration of a substrate (inorganic material or reaction component thereof) flowing in the microchannel 16 usually falls within a range of 0.01 to 20% by mass, preferably 0.1 to 10% by mass.

A material for the inorganic fine particle produced by the present invention includes, but not limited to, titanium dioxide, calcium carbonate, copper oxide, aluminum oxide, iron oxide, chromium oxide, bismuth vanadate, rutile mixed-phase pigments, silver halide, silica, and carbon black.

Next, dispersant(s) added to the reaction solution(s) will be described.

In the method for producing an inorganic fine particle of the present invention, a dispersant can be added to at least one of the reaction solutions A and B. The dispersant rapidly adsorbs onto the surfaces of the generated inorganic fine particles and thereby forms very small inorganic fine particles. The dispersant also has the effect of preventing these particles from agglomerating again. In the present invention, an anionic, cationic, amphoteric, or nonionic low-molecular-weight or high-molecular weight dispersant can be employed as such a dispersant. These dispersants can be used alone or in combination. Dispersants used for dispersing inorganic fine particles have been described in detail in pages 29 to 46 of "Dispersion Stabilization of Pigment and Surface Treatment Technique/Evaluation" (Japan Association for International Chemical Information, issued on December 2001).

The anionic dispersant (anionic surfactant) can include N-acyl-N-alkyltaurine salts, fatty acid salts, alkylsulfuric ester salts, alkylbenzenesulfonates, alkylnaphthalene-sulfonates, dialkylsulfosuccinates, alkylphosphoric ester salts, naphthalenesulfonic acid-formalin condensates, and polyoxyethylene alkylsulfuric ester salts. These anionic dispersants can be used alone or in combination of two or more of them.

The cationic dispersant (cationic surfactant) includes quaternary ammonium salts, alkoxylated polyamines, aliphatic amine polyglycol ethers, aliphatic amines, diamines and polyamines derived from aliphatic amine and aliphatic alcohol, imidazolines derived from fatty acid, and salts of these cationic substances. These cationic dispersants can be used alone or in combination of two or more of them.

The amphoteric dispersant is a dispersant having both the intramolecular anionic group moiety of the anionic dispersant and the intramolecular cationic group moiety of the cationic dispersant.

The nonionic dispersant (nonionic surfactant) can include polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, and glycerin fatty acid esters. These nonionic dispersants can be used alone or in combination of two or more of them.

The high-molecular-weight dispersant specifically includes polyvinyl pyrrolidone, polyvinyl alcohol, polyvinyl methyl ether, polyethylene oxide, polyethylene glycol, polypropylene glycol, polyacrylamide, vinyl alcohol-vinyl acetate copolymers, partial formal products of polyvinyl alcohol, partial butyral products of polyvinyl alcohol, vinyl pyrrolidone-vinyl acetate copolymers, polyethylene oxide-propylene oxide block copolymers, polyacrylates, polyvinyl sulfate, poly(4-vinylpyridine) salts, polyamides, polyallylamine salts, condensed naphthalenesulfonates, styrene-acrylate copolymers, styrene-methacrylate copolymers, acrylic ester-acrylate copolymers, acrylic ester-methacrylate copolymers, methacrylic ester-acrylate copolymers, methacrylic ester-methacrylate copolymers, styrene-itaconate copolymers, itaconic ester-itaconate copolymers, vinylnaphthalene-acrylate copolymers, vinylnaphthalene-methacrylate copolymers, vinylnaphthalene-itaconate copolymers, cellulose derivatives, and starch derivatives. In addition, natural polymers such as alginates, gelatin, albumin, casein, gum arabic, tragacanth gum, and ligninsulfonates can be used. These high-molecular weight dispersants or polymers can be used alone or in combination of two or more of them.

The amount of the dispersant formulated is preferably in the range of 0.1 to 1000 parts by mass, more preferably 1 to 500 parts by mass, even more preferably 10 to 250 parts by mass, with respect to 100 parts by mass of inorganic materials in order to further improve the uniform dispersibility and storage stability of the inorganic materials. No improvement in the dispersion stability of the inorganic fine particles is seen with less than 0.1 parts by mass of the dispersant in some cases.

Next, a method for measuring the particle sizes of the produced inorganic fine particles will be described.

Some methods for measuring fine particles show the average size of the population by digitization. Methods often used include a mode diameter showing the largest value of distribution, a median diameter corresponding to the median of an integral distribution curve, and a variety of average diameters (length-average, area-average, weight-average, etc.). The inorganic fine particles produced by the method of the present invention have any particle size within a range that does not produce a blockage in the microchannel 16. Preferably, the particle size is 1 μm or smaller, more preferably 1 nm to 500 nm, particularly preferably 1 nm to 50 nm, in terms of a mode diameter.

Next, the sizes and size distribution of the produced inorganic fine particles will be described.

A monodisperse fine particle system, which comprises fine particles having identical sizes, shows not only the identical sizes of the particles contained but also no variation of intraparticle chemical composition or crystal structure between the particles and is therefore an important determinant of the performance of the particles. Particularly, ultrafine particles of nanometer size place importance on the monodisperse system as a factor that controls the properties of the particles. The method of the present invention not only can control particle sizes but also is excellent in making the sizes identical. An arithmetic standard deviation value is used as an index representing identical sizes. The arithmetic standard deviation value of the inorganic fine particles produced by the present invention is preferably 130 nm or less, particularly preferably 80 nm or less. The arithmetic standard deviation value is a value calculated according to the equation: (particle size representing 84% of cumulative distribution)-(particle size representing 16% thereof)/2 in a method for determining standard deviation with particle size distribution as normal distribution.

EXAMPLE

The present invention will be described more specifically with reference to Example below. However, the present invention is not intended to be limited to this Example by any means.

In Example, titanium dioxide fine particles were produced as white inorganic fine particles.

The particle size distribution of the produced titanium dioxide fine particles was measured with HORIBA LB-550 Dynamic Light Scattering Particle Size Analyzer.

Reaction solutions A and B were prepared as follows:

(1) Reaction Solution A <1 vol % Alkoxide Solution>

10 ml of titanium tetraisopropoxide (TTIP) (manufactured by Wako Pure Chemical Industries, Ltd., special grade)

990 ml of 1-octanol (manufactured by Wako Pure Chemical Industries, Ltd., special grade)

These components were well mixed with stirring at room temperature and completely dissolved.

(2) Reaction Solution B <34 vol % Isopropanol Aqueous Solution>

0.0104 g of dispersant Aminofect (manufactured by SHOWA DENKO K.K., special grade)

667 ml of isopropanol (manufactured by Wako Pure Chemical Industries, Ltd., special grade)

333 ml of distilled water

These components were well mixed with stirring at room temperature and completely dissolved.

(3) A Microreactor Apparatus Used was a Three-Dimensional Microreactor Apparatus of FIG. 4 having the Following Number of Partitions (the Number of Channels) and so on:

i) The number of supply channels (n): three divided channels for the reaction solution A and three divided channels for the reaction solution B ii) Widths of supply channels 12 and 14 (W): 200 μm each iii) Heights of supply channels 12 and 14 (H): 200 μm each iv) Diameter of confluence region 18 (D): 400 μm v) Diameter of microchannel 16 (R): 400 μm vi) Areas at inlet and outlet: the total area at the inlet (S1) and the area at the outlet (S2) were set to 0.24 $mm^2$ and 0.126 $mm^2$, respectively.

vii) Intersecting angle between central axes of each supply channel 12 or 14 and microchannel 16 in confluence region 18: 90° viii) Material of apparatus: Stainless steel (SUS316)

ix) Channel processing: the channels were processed by micro-electrical discharge machining, and three parts of a supply block 32, a confluence block 34, and a reaction block 36 were sealed by mirror polishing for sealing the metal surfaces.

(4) Reaction Conditions i) Specified flow rate: a syringe pump (manufactured by Harvard Apparatus) was used to supply the reaction solution A and the reaction solution B at constant flow rates of 3.402 mL/min. and 23.71 mL/min., respectively. In this context, a dispersion liquid of the titanium dioxide fine particles flowed at a flow rate of 27.112 mL/min. in the microchannel 16. A flow rate ratio between the reaction solutions A and B was 1:7.

ii) Average flow velocities of solutions A and B: UAin was set to 0.47 m/sec.,

UBin was set to 3.29 n/sec., and Uout was set to 3.60 m/sec.

iii) Shear rate: a shear rate (U/R) in the microchannel 16=9.0× $10^3$ iv) Reaction temperature: 25° C.

(5) Production Results i) Particle size and particle size distribution results

The titanium dioxide fine particles produced by Example under the conditions described above had a median average diameter M50% of 20.1 nm with an arithmetic standard deviation, STD of 3.5 nm (CV=17.4%). As seen from this result, excellently monodisperse titanium dioxide fine particles of nanometer size could be produced stably in Example.

Moreover, stable continuous production could be performed without causing clogging during the production. For information, yields per microreactor apparatus calculated with 6000 hours as a yearly operation time was 9.8 t/year, which was a high throughput available in actual production. Furthermore, the microreactor apparatus could be operated with a pressure drop as low as 0.07 MPa, and the titanium dioxide fine particles of interest could be obtained by use of a low power.

COMPARATIVE EXAMPLE

The same solutions A and B as in Example and a 30-mL small container (tank-shaped) with a stirrer were used to produce titanium dioxide fine particles.

(1) Reaction Conditions

The small container was dipped in a constant-temperature water bath with a temperature kept at 25° C., and 23.71 mL of the reaction solution B was added to the small container and stirred at the number of revolutions of 500 rpm. During the stirring, a syringe pump (manufactured by Harvard Apparatus) was used to add 3.402 mL of the reaction solution A from the surface of the liquid at an adding speed of 3.402 mL/min.

(2) Production Results i) Particle size and particle size distribution results

The titanium dioxide fine particles produced by Comparative Example under the conditions described above had a median average diameter M50% of 57.1 nm with an arithmetic standard deviation STD of 16.1 nm (CV=28.2%), indicating a result worse than that of Example.

What is claimed is:

1. A method for producing an inorganic fine particle comprising the steps of:
    reacting two or more reaction solutions for forming an inorganic fine particle while the reaction solutions flow in a non-laminar flow state in a microchannel, thereby forming the inorganic fine particle; and
    changing a shear rate (1/sec.) represented by U/R when the diameter of a cylindrical tube equivalent to the microchannel and the average flow velocity of the solutions flowing in the microchannel are defined as R (m) and U (m/sec.), respectively,
    wherein the shear rate (U/R) is set to 100 (1/sec.) or more.

2. A method for producing an inorganic fine particle whereby two or more reaction solutions for forming an inorganic fine particle flow in a microchannel and thereby form the inorganic fine particle, the method comprising the steps of:
    dividing at least one of the two or more reaction solutions into plural solutions;
    joining at least one of the plural solutions with the other plural solution(s) so that central axes thereof intersect with each other at one point in a confluence region;
    reacting the joined solutions while the solutions flow in a non-laminar flow state in the microchannel to thereby form the inorganic fine particle; and
    changing a shear rate (1/sec.) represented by U/R when the diameter of a cylindrical tube equivalent to the micro channel and the average flow velocity of the solutions flowing in the microchannel are defined as R (m) and U (m/sec.), respectively,
    wherein the shear rate (U/R) is set to 100 (1/sec.) or more.

3. The method for producing an inorganic fine particle according to claim 2, wherein
    the two or more reaction solutions flow in a non-laminar flow state in the microchannel.

4. The method for producing an inorganic fine particle according to claim 1, wherein
    the microchannel has a characteristic length between 1 μm and 1000 μm inclusive in terms of the diameter of a cylindrical tube equivalent to the microchannel.

5. The method for producing an inorganic fine particle according to claim 2, wherein
    the microchannel has a characteristic length between 1 μm and 1000 μm inclusive in terms of the diameter of a cylindrical tube equivalent to the micro channel.

6. The method for producing an inorganic fine particle according to claim 2, further comprising
    changing a shear rate (1/sec.) represented by U/R when the diameter of a cylindrical tube equivalent to the microchannel and the average flow velocity of the solutions flowing in the microchannel are defined as R (m) and U (m/sec.), respectively.

7. The method for producing an inorganic fine particle according to claim 2, wherein
    the joining step further includes contracting the flow of the solutions in the confluence region by specifying an intersecting angle between the central axes of the solutions at the time of joining so that the intersecting angle satisfies S1>S2 when the total sum of the cross sections of all the joined solutions in the thickness direction is defined as S1 and the cross section of the microchannel in the radial direction is defined as S2.

8. The method for producing an inorganic fine particle according to claim 2, wherein
    a mixing time from the joining of the solutions in the confluence region to discharge thereof from the microchannel is set to between 1 microsecond and 1000 milliseconds inclusive.

9. The method for producing an inorganic fine particle according to claim 1, wherein
    the reaction solution(s) contain dispersant(s).

10. The method for producing an inorganic fine particle according to claim 2, wherein
    the reaction solution(s) contain dispersant(s).

11. The method for producing an inorganic fine particle according to claim 9, wherein
    at least one of the dispersants is a low-molecular-weight dispersant.

12. The method for producing an inorganic fine particle according to claim 1, wherein
    the inorganic fine particle is obtained in a form of a dispersion liquid thereof.

13. The method for producing an inorganic fine particle according to claim 2, wherein
    the inorganic fine particle is obtained in a form of a dispersion liquid thereof.

14. The method for producing an inorganic fine particle according to claim 1, wherein the inorganic fine particle produced is a titanium dioxide particle.

15. The method for producing an inorganic fine particle according to claim 2, wherein the inorganic fine particle produced is a titanium dioxide particle.

16. The method for producing an inorganic fine particle according to claim 14, wherein
   a reaction for producing the titanium dioxide fine particle is alkoxide hydrolysis.

17. The method for producing an inorganic fine particle according to claim 14, wherein
   a reaction temperature in the microchannel falls within a range of 0 to 50° C.

18. The method for producing an inorganic fine particle according to claim 1, wherein a flow rate of each reaction solution flowing in the microchannel is in a range of 0.1 to 5000 mL/min.

19. The method for producing an inorganic fine particle according to claim 2, wherein a flow rate of each reaction solution flowing in the microchannel is in a range of 0.1 to 5000 mL/min.

* * * * *